US006355193B1

(12) United States Patent
Stott

(10) Patent No.: US 6,355,193 B1
(45) Date of Patent: Mar. 12, 2002

(54) METHOD FOR MAKING A FAUX STONE CONCRETE PANEL

(76) Inventor: Gale Stott, 550 W. 1700 South, Salt Lake City, UT (US) 84115

( * ) Notice: Subject to any disclaimer, the term of this patent is extended or adjusted under 35 U.S.C. 154(b) by 0 days.

(21) Appl. No.: 09/516,554

(22) Filed: Mar. 1, 2000

(51) Int. Cl.[7] .......................... B29C 44/06; B29C 44/12

(52) U.S. Cl. ..................... 264/46.5; 156/245; 264/46.4; 264/46.6; 264/46.7; 264/255; 264/309

(58) Field of Search ......................... 264/46.4, 31, 255, 264/46.5, 309, 46.6, 46.7; 156/245

(56) References Cited

U.S. PATENT DOCUMENTS 3,307,822 A 3/1967 Stout
3,653,170 A * 4/1972 Sheckler .................... 264/46.5
3,984,957 A 10/1976 Piazza
4,010,232 A 3/1977 Labrecque
4,232,494 A 11/1980 Bauch et al.
4,241,554 A 12/1980 Infantino
4,555,888 A * 12/1985 Goldenberg et al. ....... 264/46.4
4,644,719 A 2/1987 Salazar
4,875,622 A 10/1989 Lents
4,899,498 A 2/1990 Grieb
4,944,124 A 7/1990 Armstrong
5,028,459 A * 7/1991 Lathrop ....................... 156/78
5,225,134 A * 7/1993 Nasvik et al. .............. 264/255
5,240,528 A 8/1993 Pagni
5,386,963 A 2/1995 Nasvik et al.
5,671,913 A 9/1997 Vesper
5,761,861 A 6/1998 Brackett
5,836,572 A 11/1998 Sugiyama
6,060,006 A * 5/2000 Savenok .................... 264/46.6
6,113,995 A * 9/2000 Austin ......................... 428/15

FOREIGN PATENT DOCUMENTS

JP 58-199128 * 11/1983 ................ 264/46.4
JP 2-8005 * 1/1990 ................ 264/46.4
JP 4-11154 * 1/1992 ................ 264/46.4
JP 4-202958 * 7/1992 ................ 264/46.4

* cited by examiner

*Primary Examiner*—Allan R. Kuhns
(74) *Attorney, Agent, or Firm*—Thorpe North & Western

(57) ABSTRACT

A wall or panel has a thin concrete layer with a cross-sectional contour having protrusions and indentations forming other objects, such as stone work, brick or wood. A reinforcement layer may be affixed to the concrete layer to provide tensile strength and impact resistance to the concrete layer. A foam layer is affixed to the reinforcement layer to further reinforce the concrete layer, and so that the wall or panel is light weight. A second concrete layer or a rigid backing layer may be disposed opposite the concrete layer so that the foam is disposed therebetween. A method for forming the wall or panel includes spraying the concrete onto a mold surface which has indentations and protrusions for forming the other objects. The reinforcement layer is sprayed onto the cured concrete layer. The mold is closed and foam is introduced into the mold.

39 Claims, 11 Drawing Sheets

METHOD FOR MAKING A FAUX STONE CONCRETE PANEL

BACKGROUND OF THE INVENTION

1. The Field of the Invention

The present invention relates generally to a light-weight concrete panel or wall which appears as another building material, such as stone work, brick, wood or the like. More particularly, the present invention relates to a panel or wall having a thin concrete face layer with a molded contour or otherwise shaped to appear as stone work or the like, a reinforcing elastomer layer, and an inner foam layer.

2. The Background Art

Traditional walls have been constructed from individual stones, rocks, blocks, or bricks assembled together into the shape of a wall and held together with mortar. One problem with traditional walls of this type is they are typically expensive and time-consuming to construct. Another problem is their great weight.

Prior attempts have been made to simulate such stone work or brick walls using less expensive materials and less labor-intensive methods. One such attempt involves constructing a wall from concrete. The concrete may be molded to the shape of bricks or otherwise textured to appear as brick. For example, concrete sidewalks have been provided with textured surfaces by stamping a stone shape into the concrete before it hardens.

Another such example includes manually texturing the concrete before it cures. One problem with using concrete is that concrete tends to have a substantially smooth texture, unlike natural stone or brick. Another disadvantage with such concrete walls is that solid concrete is also extremely heavy.

Another attempt at providing such a textured or shaped surface includes veneering, in which actual or simulated stone or brick is adhered to a conventional concrete wall. One disadvantage with veneering is the expense, time and care involved in providing the veneer.

Another attempt simply involves making panels from plastic which has been molded. One disadvantage with such plastic panels is that they often do not provide a realistic appearance.

In addition, attempts have been made to reduce the weight of concrete, load bearing building elements. Such attempts include the addition of fillers into concrete. Another technique involves bonding a plurality of laminations, including adhering a lightweight laminate to the concrete laminate. Such techniques typically involve a foam block onto which a concrete mixture is applied or onto which a concrete laminate is adhered. One disadvantage with these techniques is that the foam block must be pre-shaped. Another disadvantage is that the building elements have thick concrete layers, and thus are heavy.

SUMMARY OF THE INVENTION

It has been recognized that it would be advantageous to develop a wall or panel which has the appearance of natural stone work, rock, brick, wood, or the like, which is light-weight and durable. The invention provides a wall or panel with a thin concrete layer to reduce the weight of the wall or panel. The concrete layer has interior and exterior surfaces, and a cross-sectional contour. The contour projects outwardly to form macro projections in the exterior surface, and macro indentations in the interior surface. The contour also projects inwardly to form macro indentations in the exterior surface, and macro projections in the interior surface. The contour, or projections and indentations, may form natural objects, such as stone work, brick, wood, and the like. In a more detailed aspect of the invention, the concrete layer has a substantially constant thickness at the projections and indentations. In another more detailed aspect of the invention, the concrete layer is less than approximately 0.5 inches thick to reduce weight.

A foam layer is coupled to the interior surface of the concrete layer, and has protrusions mating with the indentations in the interior surface of the concrete layer. The foam layer provides reinforcement to the thin concrete layer and reduces the weight of the wall or panel. The foam layer may have fiber reinforcement.

In accordance with one aspect of the present invention, the wall or panel may have a thin elastomer layer affixed to the concrete layer to reinforce the concrete layer, and to provide tensile strength and impact resistance. In a more detailed aspect of the invention, the reinforcement layer may include an elastomer layer, such as a urethane layer. Alternatively, the reinforcement layer may include a high density foam, and the foam layer may include a low density foam. The reinforcement layer may include fiber reinforcement.

In accordance with another aspect of the present invention, the wall or panel may have a rigid backing layer spaced-apart from the elastomer layer, with the foam layer disposed between, and affixed to, the elastomer layer and backing layer to further reinforce the concrete layer and making the wall or panel light-weight.

The rigid backing layer may be a second concrete layer spaced-apart from and opposite the first concrete layer. The second concrete layer may have a similar cross-sectional contour.

The wall or panel may be configured to be free-standing fencing structures. Alternatively, the wall or panel may be configured as a facade to be affixed to an exterior wall of a building.

A method for making the wall or panel includes providing a mold having an inner mold surface with macro indentations and macro protrusions. A wet mixture of concrete material is applied to the inner mold surface of the mold to form a concrete layer with a cross-sectional contour corresponding to the indentations and protrusions of the inner mold surface. Preferably, the concrete material is sprayed onto the inner mold surface. Preferably, the wet mixture of concrete material is applied in a substantially constant thickness at the projections and indentations. The concrete material is cured until dry.

Foam is introduced into the mold to form a foam layer secured to the cement layer with the foam having protrusions mating with the concrete layer. The mold provides support to the concrete layer as the foam expands. The secured concrete and foam layers are removed from the mold.

In accordance with one aspect of the method of the present invention, the layer of reinforcement material is applied to the concrete layer prior to introducing the foam to form a reinforcement layer. Preferably, the reinforcement layer is sprayed onto the cured concrete layer.

In accordance with another aspect of the method of the present invention, the rigid backing layer is spaced-apart from the mold surface prior to introducing the foam into the mold. Alternatively, the rigid backing layer may be applied to the foam layer.

In accordance with another aspect of the method of the present invention, the mold may be disposed in a vertical orientation, either throughout the process, or just before the foam is introduced into the mold. Thus, the wall or panel is vertically oriented to facilitate handling and conserve space.

Additional features and advantages of the invention will be set forth in the detailed description which follows, taken in conjunction with the accompanying drawing, which together illustrate by way of example, the features of the invention.

DETAILED DESCRIPTION

Figure 1A:
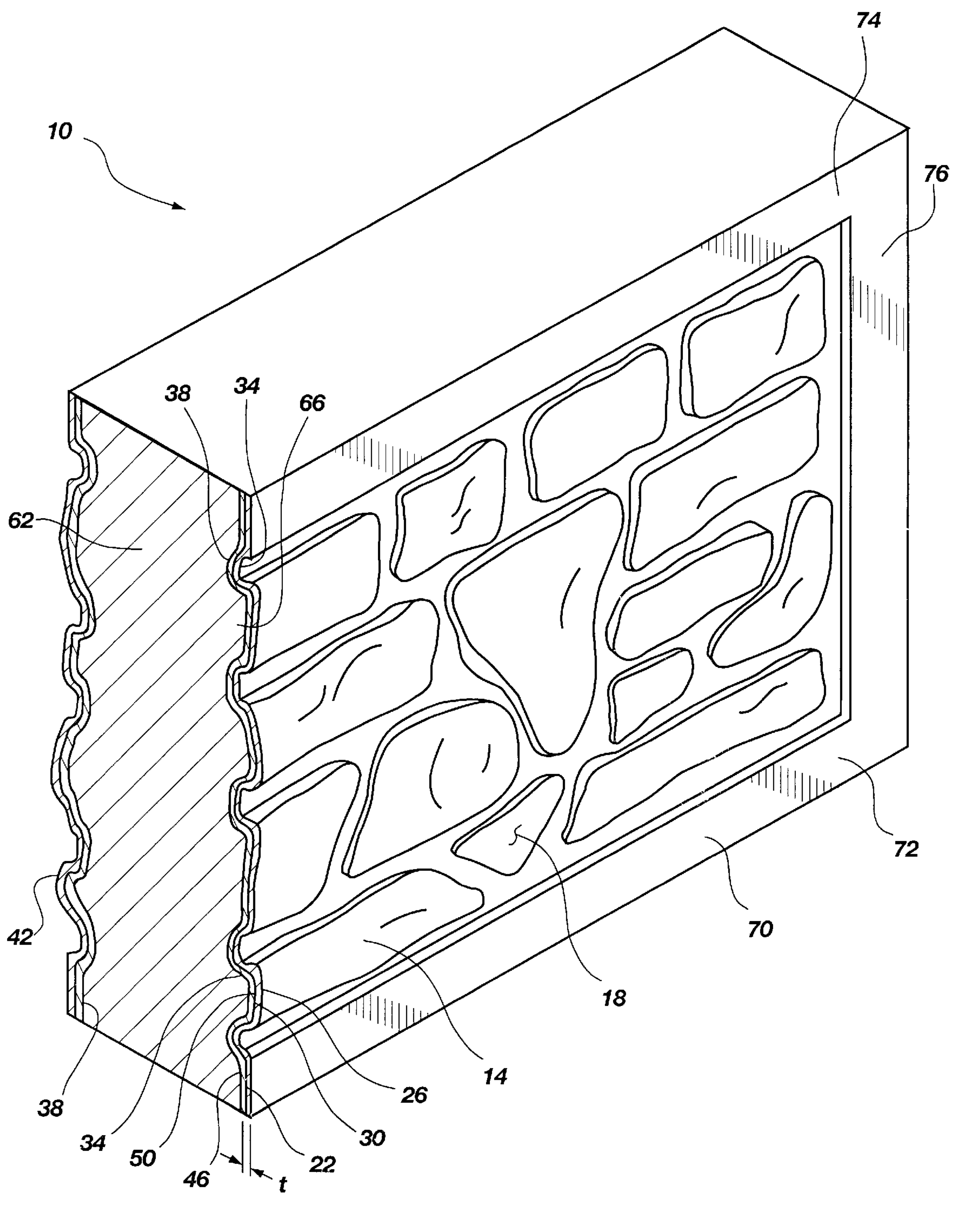
FIG. 1*a* is a perspective view, partially in section, of a wall or panel in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

As illustrated in the Figures, walls or panels in accordance with the present invention are shown which are configured to appear as other objects or natural objects, including for example, stone work, rock, brick, or wood, and the like, and which are light-weight and durable. As used herein, the terms "wall" and "panel" are used broadly to refer to walls or panels which may be used in building construction systems as facades, and walls used in fence systems.

Figure 1B:
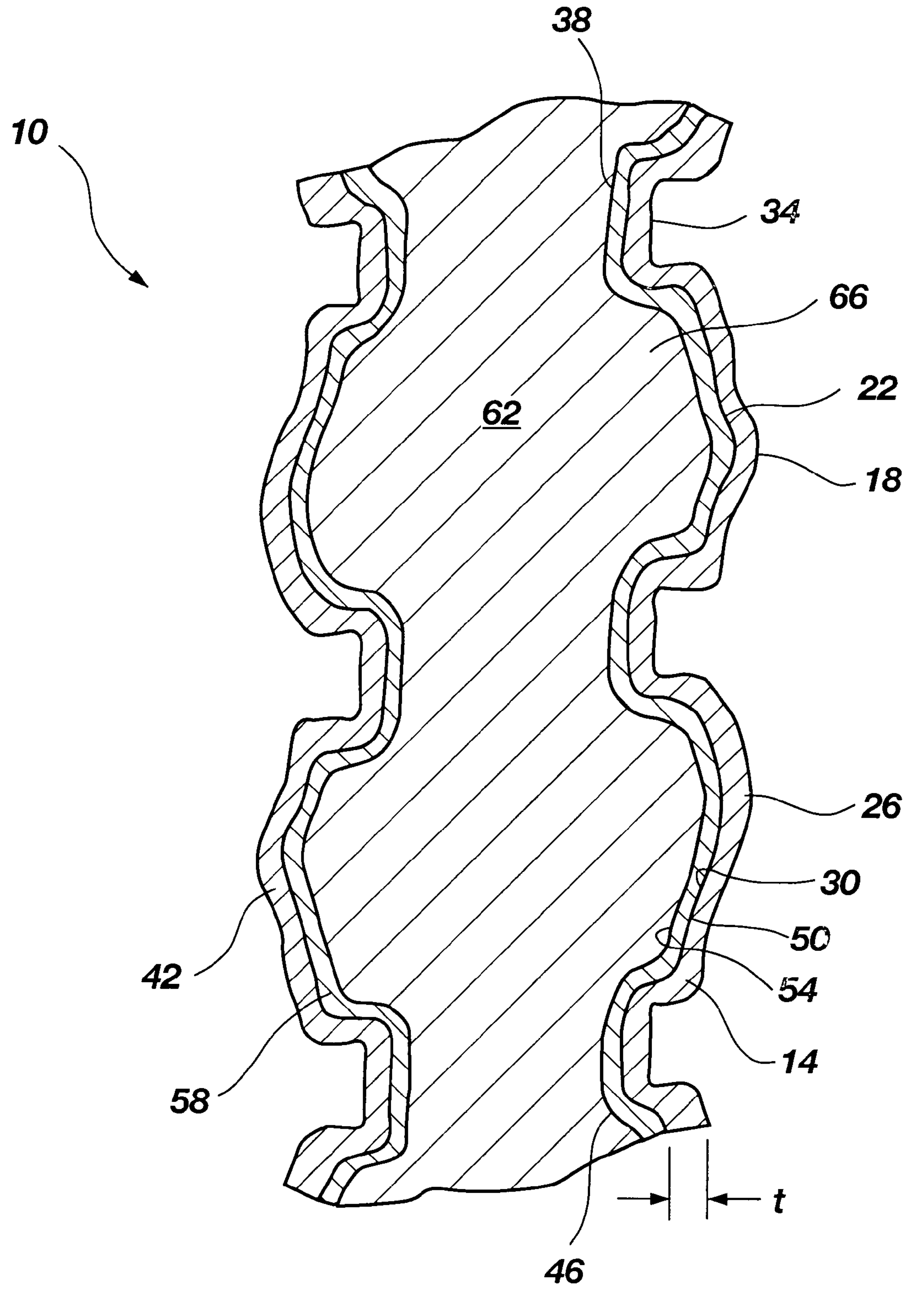
FIG. 1*b* is a more detailed, partial cross-sectional view of the wall or panel shown in FIG. 1*a;*

Referring to FIGS. 1*a* and 1*b*, a wall or panel indicated generally at 10 in accordance with the present invention is shown configured as a wall in a fencing system. Thus, the wall or panel is oriented in a vertical orientation and configured to be free standing. The wall or panel 10 includes at least one thin concrete layer, such as first thin concrete layer 14. The concrete layer 14 has an exterior surface 18 which faces outwardly to be seen, and an opposite interior surface 22 which faces inwardly.

The concrete layer 14 advantageously has a cross-sectional contour which projects outwardly to form projections 26 in the exterior surface 18, and indentations 30 in the interior surface 22. In addition, the cross-sectional contour projects inwardly to form indentations 34 in the exterior surface 18 and projections 38 in the interior surface 22. Thus, the exterior surface 18 includes projections 26 and indentations 34, while the interior surface 22 includes indentations 30 which correspond to the protrusions 26 in the exterior surface 18, and protrusions 38 which correspond to indentations 34 in the exterior surface 18.

The projections and indentations are "macro-projections" and "macro-indentations," respectively, meaning they are sized to produce an architectural effect which is visible from a distance, as opposed to surface or material irregularities. The projections 26 and indentations 34 of the exterior surface 18, and thus the cross-sectional contour, are sized and shaped to appear as other objects, or natural objects, including for example, rocks, stone work, brick, wood or the like.

The concrete layer 14 has a thickness t which is substantially constant throughout the portion of the concrete layer 14 including the projections and indentations. It is of course understood that the thickness of the concrete layer 14 may vary at the indentations and protrusions, or throughout the cross sectional contour, especially at areas of curvature. By a "substantially constant thickness," it is meant that the inner surface 22 of the concrete layer 14 follows the outer surface 18 as the outer surface 18 projects inwardly and outwardly, as opposed to remaining straight. Thus, the concrete layer 14 will cure substantially evenly as discussed in greater detail below. The thickness t of the concrete layer 14 is preferably less than one inch, more preferably less than one-half inch, and most preferably less than one-eighth inch, to reduce the weight of the concrete layer.

The concrete layer 14 may be formed of a concrete mix which provides a cementitious or textured surface to appear as real stone work or brick. It will be appreciated that concrete itself has a relatively smooth surface. Thus, the concrete mix preferably includes sand to provide strength to the concrete, and to provide a rougher surface texture. In addition, the concrete mix may include a plasticizer to keep the mixture as dry as possible. In addition, the concrete mix may include a polymer to add flexibility. In addition, the concrete mix may include an accelerator for faster curing. Furthermore, a coloring may be applied to the exterior surface 18 of the concrete layer 14 to further provide the desired appearance as stone work, brick, etc. For example, a stone like coloring may be added to the protrusions 28 in the exterior surface 18, while the indentations 34 in the exterior surface 18 retain the natural coloring of the concrete mix. In addition, color or pigment may be added directly to the concrete mixture.

The concrete layer 14 advantageously is thin to reduce weight of the wall or panel 10. In addition, the concrete layer 14, or concrete mixture, preferably and advantageously is free of fiber reinforcement. Concrete is often reinforced with glass fiber, which must be a special alkaline resistant glass fiber, which is very expensive. Thus, a substantial cost reduction is realized without using the more expensive glass fiber reinforced concrete. It is of course understood that the concrete layer may be fiber reinforced.

The panel 10 may also have a second concrete layer 42 opposite and spaced-apart from the first concrete layer 14. The second concrete layer 42 may be similar to the first concrete layer 14, and includes a cross sectional contour with indentations and protrusions configured to appear as stone work, brick, etc.

The wall or panel 10 advantageously has a reinforcement layer 46 adjacent and affixed to the concrete layer 14. The reinforcement layer 46 preferably is an elastomer layer, but may also be a foam layer, such as a high density foam, as discussed in greater detail below. The reinforcement or elastomer layer 46 advantageously provides tensile strength and impact resistance to the concrete layer 14. As stated above, the concrete layer 14 is as thin as possible to save weight, and may lack fiber reinforcement to reduce cost. Thus, the elastomer layer 46 strengthens the thin concrete layer 14, and provides tensile strength and impact resistance to the concrete layer 14. The elastomer layer 46 preferably has a thickness between 60 and 225 mils depending on the strength required. In addition, the elastomer layer 46 may be reinforced with fiberglass. A less expensive fiberglass may be used in the elastomer because it does not need to be alkaline resistant.

The elastomer layer 46 has an exterior surface 50 which is directly affixed to the interior surface 22 of the concrete layer 14. Thus, the exterior surface 50 of the elastomer layer 46 has protrusions and indentations which match the respective indentations and protrusions of the inner surface 22 of the concrete layer 14. The elastomer layer 46 also has an interior surface 54. The interior surface 54 of the elastomer layer 46 also has indentations which correspond to protrusions in the exterior surface 50, and protrusions which correspond to indentations in the exterior surface 50. Thus, the elastomer layer 46 has a cross-sectional contour which matches or mates with the cross-sectional contour of the concrete layer 14. In addition, the elastomer layer 46 has a thickness which is substantially consistent at the protrusions and indentations.

The elastomer layer 46 preferably is a sprayable urethane, as discussed in greater detail below. The elastomer layer 46 or reinforcement layer alternatively may be epoxy or fiberglass polyester. In addition, the elastomer layer 46 may be reinforced with chopped fiberglass. Again, a less expensive fiberglass may be used in the elastomer because it does not need to be alkaline resistant. The concrete layer 14 protects the reinforcement layer 46 from the sun, because the reinforcement layer 46 may not be UV stable, such as with some elastomers.

In addition, the wall or panel 10 may include a second elastomer layer 58 affixed to the second concrete layer 42, which is similar to the first elastomer layer 46.

The wall or panel 10 advantageously also has a foam layer 62 disposed between the concrete layers 14 and 42, and the elastomer layers 46 and 58. The foam layer 62 is coupled or attached to the interior surfaces 54 of the elastomer layers 46 and 58. The foam layer 62 advantageously has protrusions 66 which extend outwardly to mate with the indentations in the interior surface 54 of the elastomer layer 46, and may also extend into the indentations 30 in the inner surface 22 of the concrete layer 14. Thus, the foam layer 62 has a thickness which varies at the protrusions and indentations, such that the wall or panel 10 is substantially solid. The concrete and elastomer layers 14 and 46 may be flexible by themselves. Thus, the foam layer 62 advantageously is light-weight and provides further reinforcement and stiffness to the elastomer and concrete layers 46 and 14.

The foam layer 62 may be a MDI poly-ether, polyester, or polyether blend. The foam layer 62 may also be a poly-urea elastomer or polyurethane. The foam layer 62 preferably is low density, or has a density of two to five pounds. Alternatively, the foam layer 62 may have a density between two and thirty pounds. In addition, the foam layer 62 may be fiber reinforced. A less expensive fiberglass may be used in the foam because it does not need to be alkaline resistant.

The foam layer 62 advantageously provides a filler between the concrete layers 14 and 42 to prevent unwanted voids or spaces, particularly near the concrete layer 14, which may weaken the concrete layer. In addition, the foam layer 62 advantageously bonds the opposite concrete layers 14 and 42 together. Furthermore, the foam layer 62 provides thermal and sound insulation to the wall or panel 10.

As shown in FIG. 1*a*, the wall or panel 10 is configured for use as a wall of a fencing system. The wall 10 may have a perimeter border 70 or raised portion to frame and enclose the protrusions 26 and indentations 34 configured to appear as stone work, brick, etc. The border 70 may include a base 72 configured to appear as a foundation, a top 74 configured to appear as a cap, and sides 76 configured to appear as vertical support columns. The border 70 may be configured to appear as concrete, as shown, or may also have indentations and protrusions to appear as stone work, brick, etc. The border 70 may be constructed as the rest of the wall 10, and be formed of the thin concrete layer 14, the elastomer reinforcement layer 46, and the foam layer 62. Thus, an entire segment of the wall system may be formed of the wall 10 to be light weight and durable.

Figure 2A:
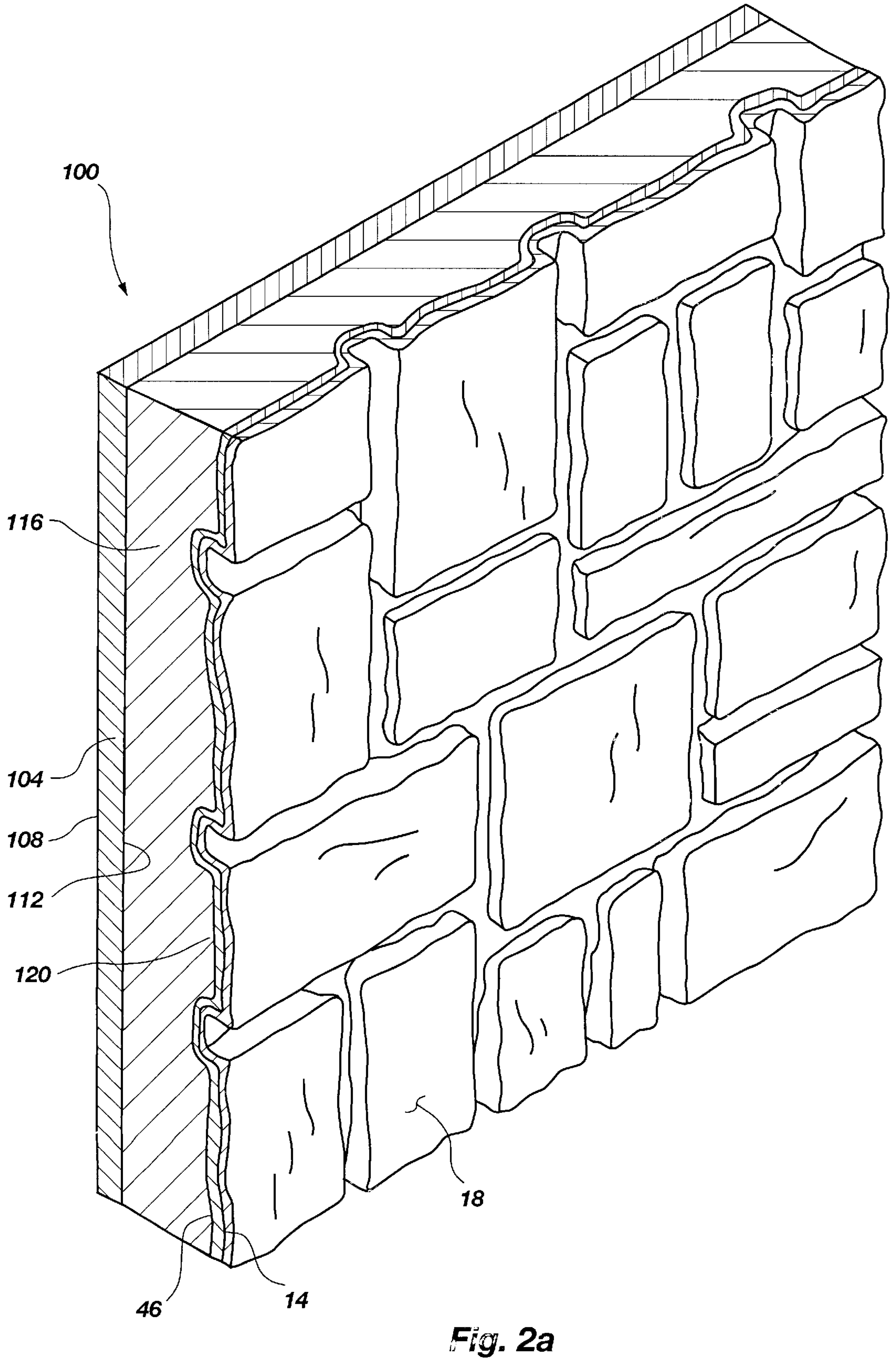
FIG. 2*a* is a partial perspective view, partially in section, of another wall or panel in accordance with the present invention.
Figure 2B:
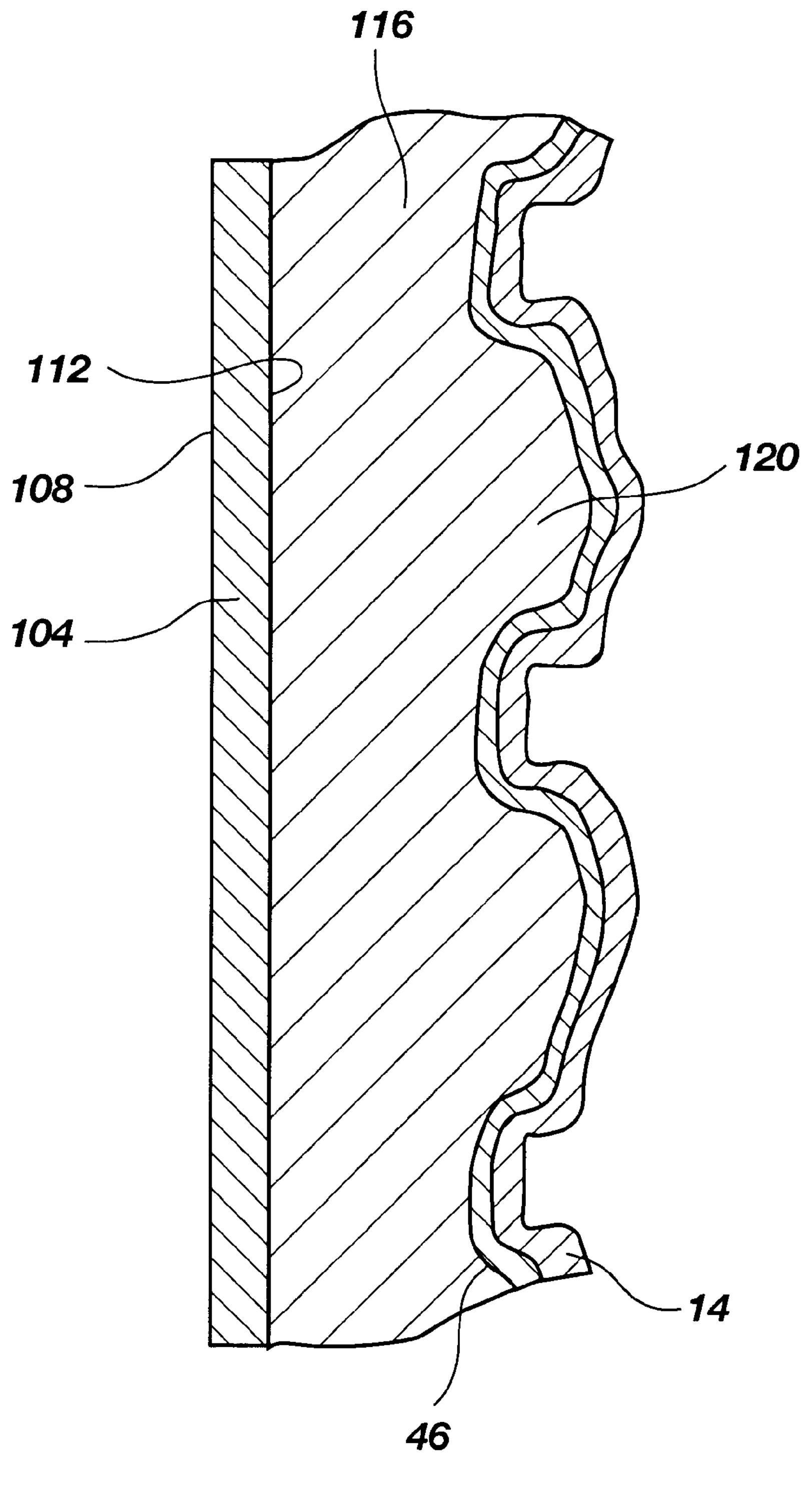
FIG. 2*b* is a more detailed, partial cross-sectional view of the wall or panel shown in FIG. 2*a;*

Referring to FIGS. 2*a* and 2*b*, an alternative embodiment of a wall or panel, indicated generally at 100, includes the thin concrete layer 14, and thin elastomer layer 46, as described above. In addition, the wall or panel 100 includes a rigid backing layer 104 spaced-apart from the concrete and elastomer layers 14 and 46. The rigid backing layer 104 has an exterior surface 108, and an interior surface 112 opposing an interior surface 54 of the elastomer layer 46. A foam layer 116 is disposed between the rigid backing layer 104 and the elastomer layer 46 or concrete layer 14.

As described above, the foam layer 116 includes protrusions 120 which extend into the indentations of the elastomer layer 46 and concrete layer 14. The rigid backing layer 104 may be a straight or flat layer, such as a rigid panel of fiberboard, or the like, adhered to the foam. Alternatively, the rigid backing layer 104 may be a flat concrete layer or an elastomer layer.

The rigid backing layer 104 may be used in applications in which only a single side of the wall or panel 100 will be seen. For example, the rigid backing layer 104 may be utilized to affix the wall or panel 100 to the exterior of a building to form a facade. Again, the thin concrete layer 14 allows the wall or panel 100 to be light-weight, and thus more easily positioned, handled, secured, etc. In addition, the backing layer 104 protects the foam layer 116.

As shown in FIG. 2*a*, the wall or panel 100 may be configured as a free standing fence, or may be configured as a building panel for being affixed to a building. In either case, the outer surface 18 of the concrete layer 14 may have a continuous surface of protrusions 26 and indentations 34 extending over the entire surface area of the outer surface 18 of the concrete layer 14. Thus, several walls or panels 100 may be positioned adjacent one another to form a continuous surface.

As stated above, the reinforcement layer 46 preferably is an elastomer layer, and most preferably a urethane layer. Alternatively, as indicated above, the reinforcement layer 46 may be a layer of high density foam, such as 10 to 20 pound density, while the foam layer 62 is a low density foam layer, for example, two to five pound density.

Figure 3:
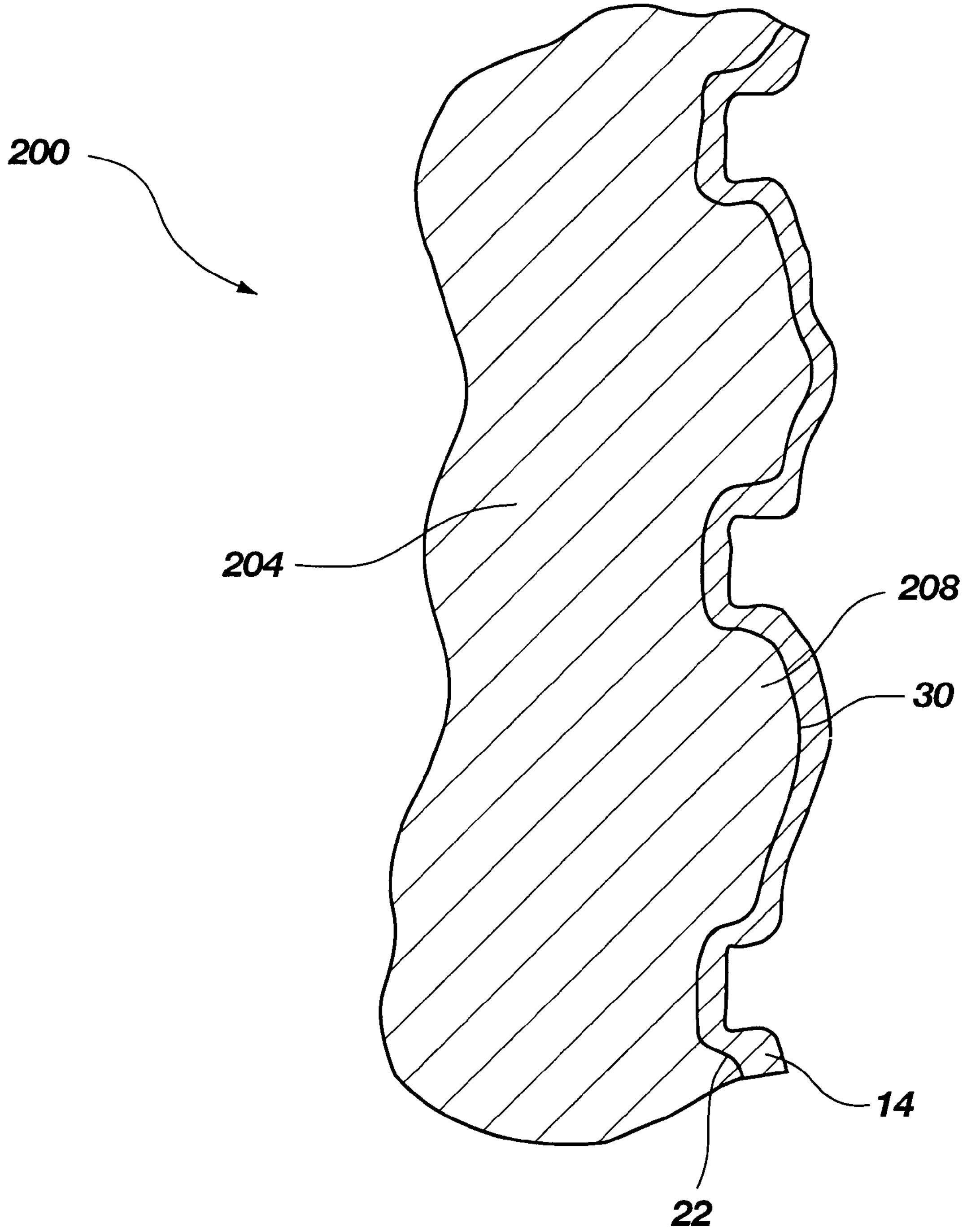
FIG. 3 is a partial cross-sectional view of another wall or panel in accordance with the present invention.

Referring to FIG. 3, an alternative embodiment of a wall or panel 200 is shown with the concrete layer 14 and a rigid backing layer 104 (not shown in FIG. 3) as described above. A foam layer 204 is disposed between the concrete layer 14 and the rigid backing layer 104. Thus, the foam layer 204 directly attaches to the inner surface 22 of the concrete layer 14. As described above, the foam layer 204 has a varying thickness such that the foam layer 204 has projections 208 which extend into the indentations 30 in the inner surface 22 of the concrete layer 14. The foam layer 204 preferably is a high density foam for greater durability and strength, but may be a low density foam depending on the application. Thus, the high density foam layer 204 acts as both the reinforcement layer and the filler.

The wall or panel 200 may be configured to be attached to the exterior of a building as a facade. In such case, the wall or panel 200 preferably is relatively thin, and thus the foam layer 204 preferably is a thin, high density foam. The foam layer 204 may have a thickness less than a few inches.

Figure 4:
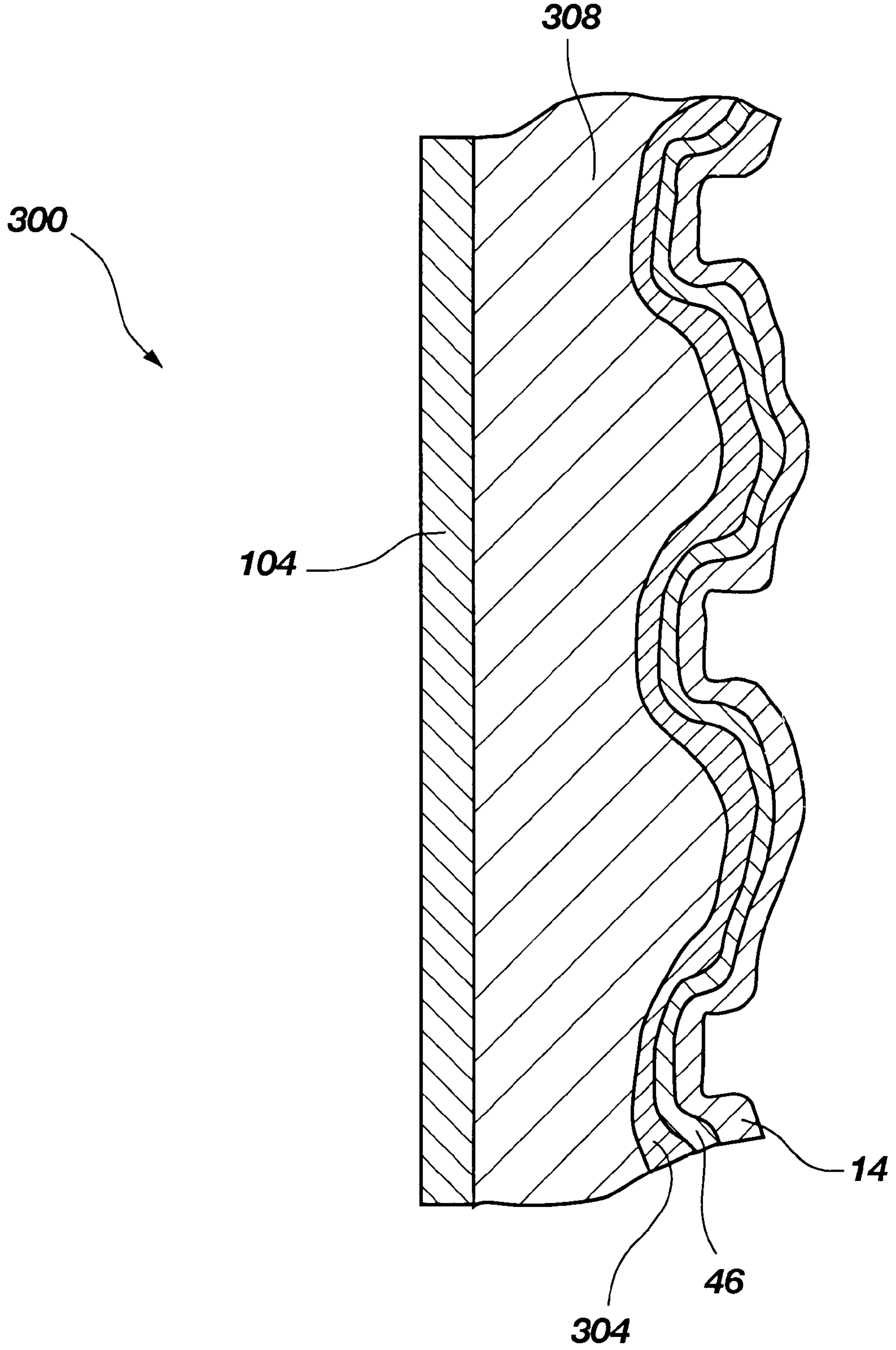
FIG. 4 is a partial cross-sectional view of another wall or panel in accordance with the present invention.

Referring to FIG. 4, an alternative embodiment of a wall or panel, indicated generally at 300, has a thin concrete layer 14, a thin elastomer layer 46, and a rigid backing layer 104 as described above. In addition, the wall or panel 300 has a layer of rigid, high density foam 304 adjacent and affixed to the elastomer layer 406, and a layer of low density foam 308 disposed between the rigid backing layer 104 and the layer of high density foam 304. The layer of high density foam 304 provides additional rigidity and stiffness to the wall or panel 300, while the low density foam 308 reduces the weight of the wall or panel 300.

Figure 5:
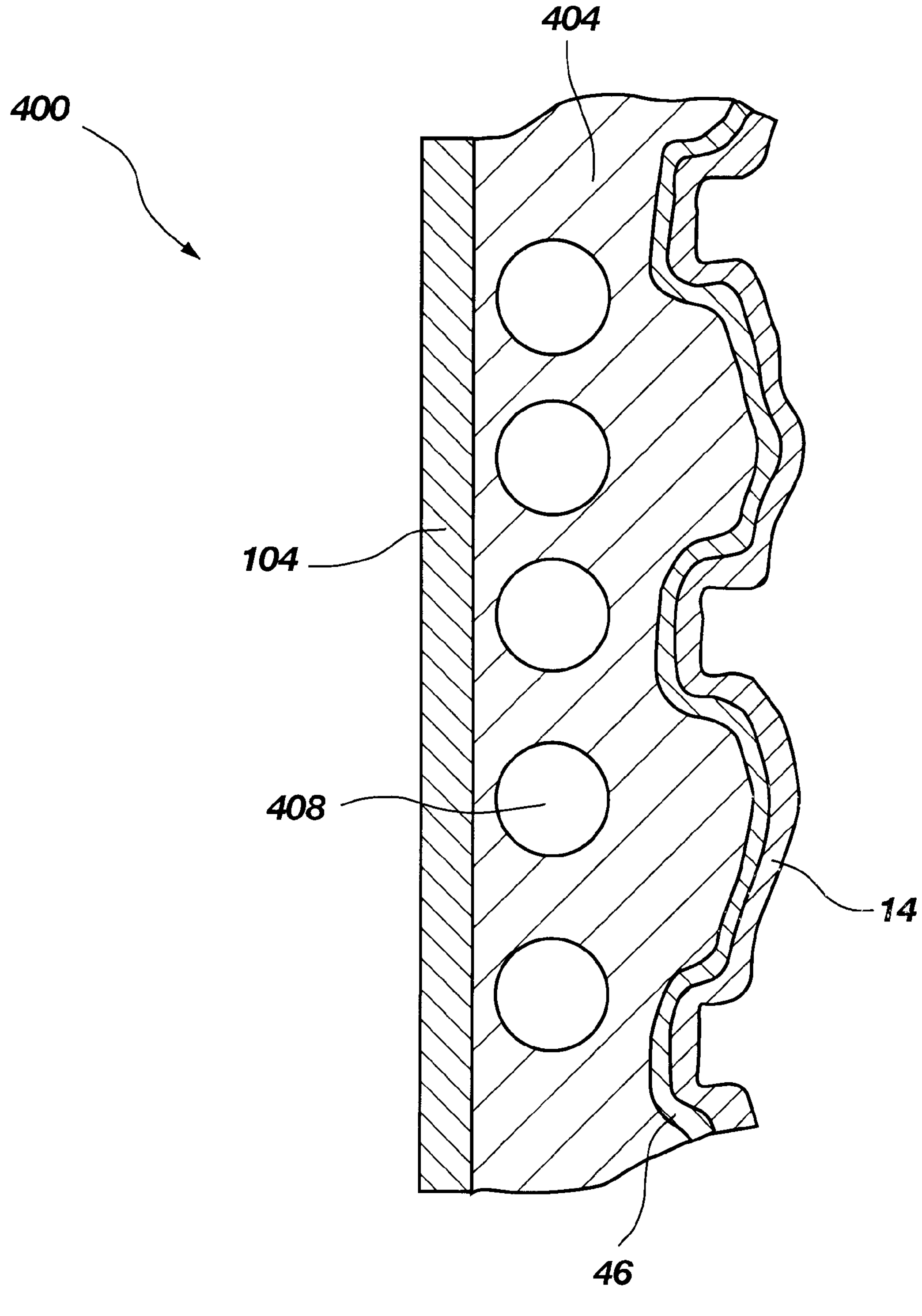
FIG. 5 is a partial cross-sectional view of another wall or panel in accordance with the present invention.

Referring to FIG. 5, an alternative embodiment of a wall or panel, indicated generally at 400, is shown with increased sound reduction, or noise insulation properties. The wall or panel 400 may be similar to any of the walls or panels described hereto, and thus has at least a thin concrete layer 14, and a foam layer 404. As described above, the various walls or panels preferably have a solid interior, or at least lack inadvertent voids, particularly near the concrete layer 14, which may result in weak or damaged portions. The foam layer 404 includes a plurality of voids 408 or cavities formed in the foam layer 404 to improve the sound dampening qualities of the wall or panel 400. The cavities 408 are macro-voids, or sized to reduce sound, as opposed to the smaller voids inherent in the cell structure of the foam.

It will of course be understood that any of the walls or panels described above may have double faces or be two-sided, such as the wall or panel 10 shown in FIG. 1, with both faces being configured to appear as stone work, brick, etc. It is also understood that any of the wall or panel members described above may have a single face which is shaped and configured to appear as stone work, brick, etc., and an opposite face which is configured to be attached to another object, or simply to remain plain, such as walls and panels 100, 200, 300, and 400, shown in FIGS. 2–5. Thus, the second concrete layer 42 in FIG. 1 may be replaced with a rigid backing layer. Likewise, the rigid backing layers 104 in FIGS. 2–5 may be replaced with a second concrete layer which is configured to appear as stone work, brick or the like.

In addition, the various walls or panels described above may be configured to be attached to other objects or other walls or panels. For example, the sides of the walls or panels may the configured with tongue and groove type interconnections, with a first panel having a tongue, and a second panel having a groove, such that the tongue of the first panel may be inserted into the groove of an adjacent second panel to facilitate securing adjacent panels. Such tongue and groove type interconnections may be formed integrally with the walls and panels. As another example, the panels may have inserts for interconnecting the panels to one another, or other objects.

In addition, the various walls or panels described above may contain other structural members to reinforce the panels or facilitate attachment of the panels to other objects, such as the exterior of a building. For example, elongated metal bars may be disposed in the foam layer to provide additional structural rigidity to large panels.

The walls or panels of the present invention advantageously are light weight and durable. Thus, the walls or panels may be easily manufactured at a facility, easily transported, and easily arranged at a building site.

Figure 6:
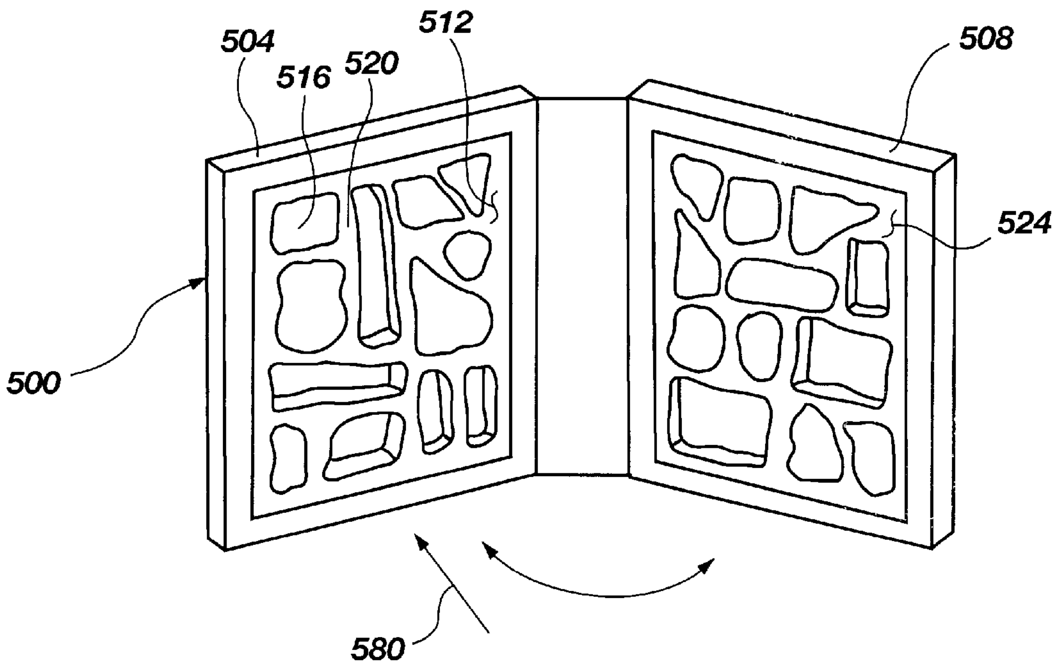
FIG. 6 is a perspective view of an embodiment of a mold in accordance with the present invention, shown in an open configuration.
Figure 7:
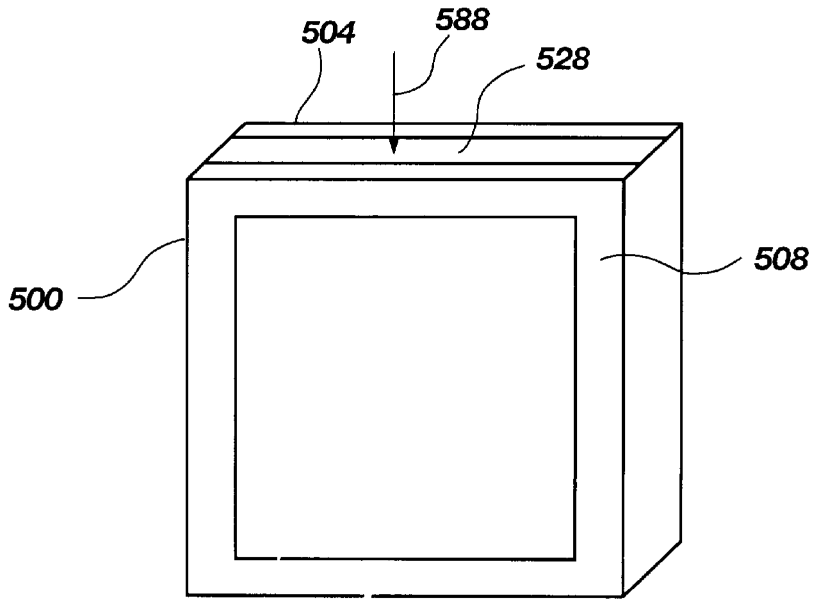
FIG. 7 is a perspective view of the mold of FIG. 6 shown in an closed configuration.

The present invention also involves a method for making the walls or panels. Referring to FIG. 6, a mold, indicated generally at 500, is shown for forming the panels or walls of the present invention. The mold 500 preferably has first and second mold halves 504 and 508. The mold 500, and thus the mold halves 504 and 508, may be oriented vertically in order to save space. The mold halves 504 and 508 preferably are pivotally coupled along one side, such that the mold halves 504 and 508 may be pivoted with respect to one another between an open position as shown in FIG. 6 and a closed position as shown in FIG. 7.

The first mold half 504 includes an inner mold surface 512 which includes macro-indentations 516 and macro-protrusions 520. The indentations and protrusions 516 and 520 are configured to produce the protrusions 26 and indentations 34 in the concrete layer 14. Similarly, the second mold half 508 may include a second mold surface 524 which may also have indentations and protrusions. It is of course understood that both mold surfaces 512 and 524 will have indentations and protrusions to form a dual sided wall or panel 10 as shown in FIG. 1. Alternatively, only the first mold surface 512 may have indentations and protrusions if the mold is to be used to produce a wall or panel with a single shaped face.

As shown in FIG. 6, the mold 500 may be opened so that both mold surfaces 512 and 524 are easily accessible. Color or pigment may be applied to the indentations 516 in the mold surface 512. The color or pigments correspond to the desired color of the stone or brick. Alternatively, color or pigment may be added directly to the concrete mixture of the concrete layer 14.

Figure 8:
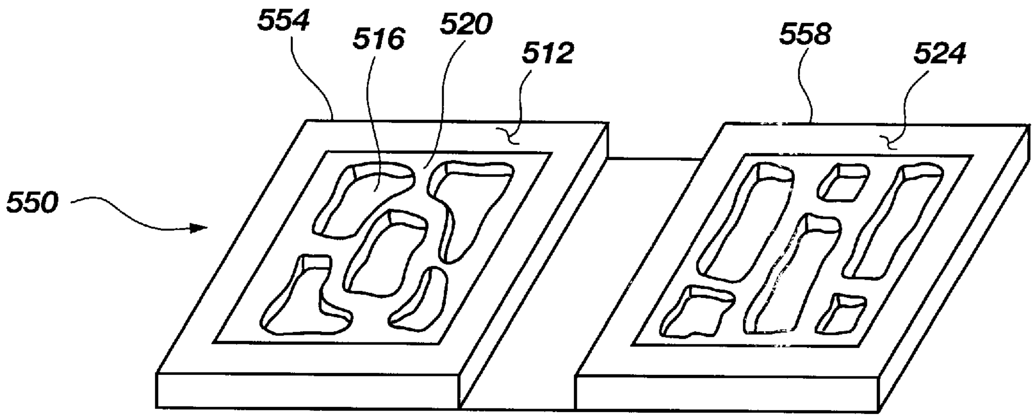
FIG. 8 is a perspective view of another embodiment of a mold in accordance with the present invention, shown in an open configuration.
Figure 9:
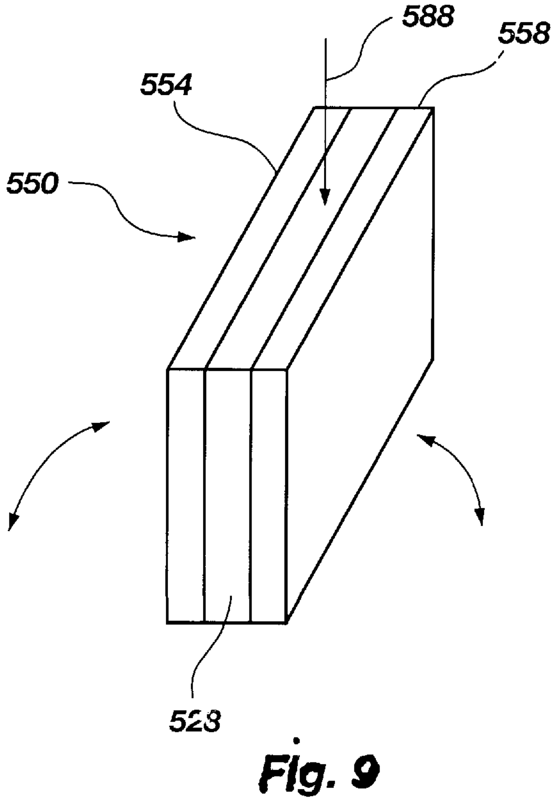
FIG. 9 is a perspective view of the mold of FIG. 8 shown in an closed configuration.

Referring to FIGS. 8 and 9 another mold 550 is shown for forming the walls or panels of the present invention. The mold 550 preferably has first and second mold halves 554 and 558. The mold halves 554 and 558 preferably are pivotally coupled to each other or the ground at their bottom sides, so that the mold halves 554 and 558, may be oriented horizontally in the open position, as shown in FIG. 8, and vertically in the closed position, as shown in FIG. 9.

Similar to the mold 500 shown in FIGS. 6 and 7, the first mold half 554 of mold 550 includes the inner mold surface 512 which includes macro-indentations 516 and macro-protrusions 520. Similarly, the second mold half 558 may include the second mold surface 524 which may also have indentations and protrusions. As shown in FIG. 8, the mold 550 may be opened so that both mold surfaces 512 and 524 are easily accessible.

Figure 10D:
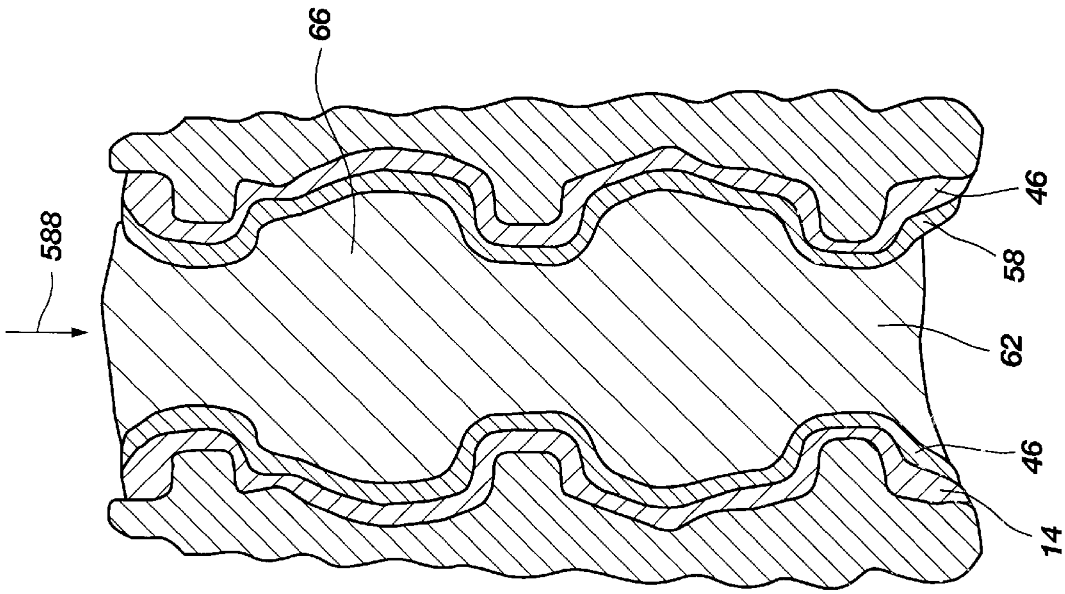
FIGS. 10*a*–10*d* are schematic views of a method in accordance with the present invention.
Figure 10C:
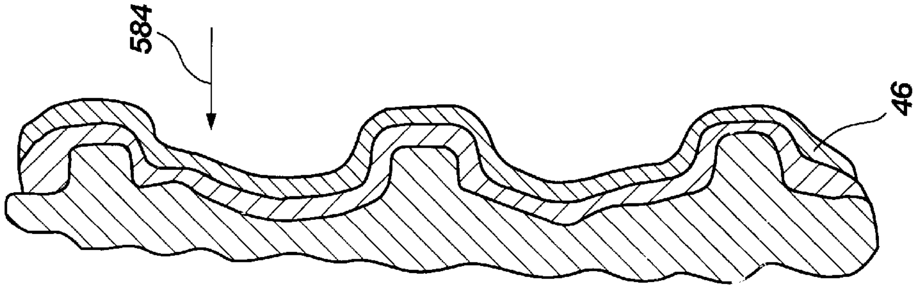
Figure 10B:
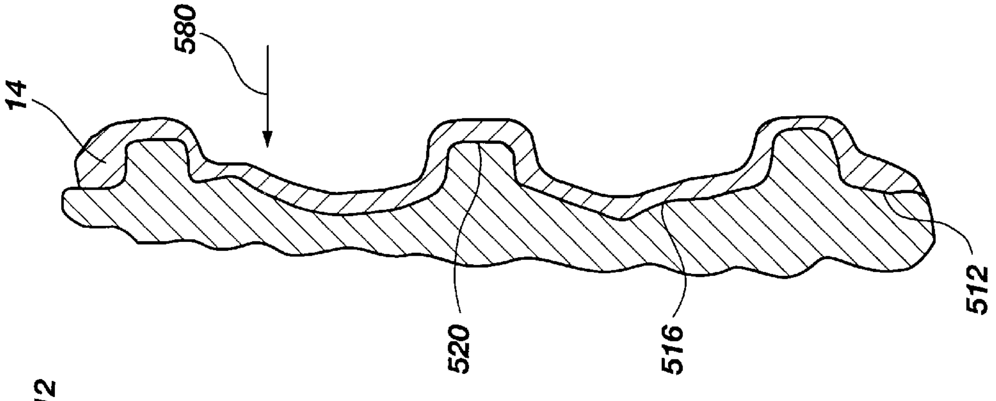
Figure 10A:
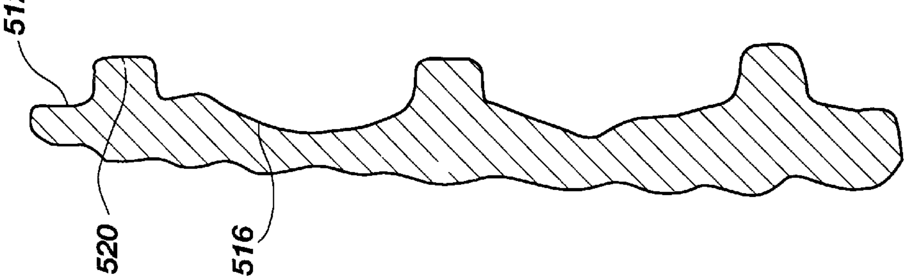

Referring to FIG. 10*a*, a mold, such as molds 500 (FIG. 6) or 550 (FIG. 8) is provided with at least the mold surface 510. Preferably, the mold is initially open into an open configuration, as shown in FIG. 6 or 8. Referring to FIG. 10*b*, a wet mixture of concrete material is applied to at least the first mold surface 512 to form the first concrete layer 14. In addition, the wet mixture of concrete material may also be applied to the second mold surface 524 to produce the second concrete surface 42 for a double sided wall or panel. The concrete preferably is sprayed, indicated by arrow 580, onto the mold surface 512 with a sprayer in a thin layer preferably between one-eighth of an inch to one-half of an inch or more. As stated above, the concrete material preferably is applied as thinly as possibly to reduce weight. In addition, the concrete material preferably is free of glass reinforcement to reduce the cost associated with alkali resistant fiberglass. Alternatively, the concrete material may be reinforced with alkali resistant fiberglass.

In addition, the concrete material preferably is applied to the mold surface 512 in a consistent or uniform thickness at the indentations and protrusions 516 and 520. As stated above, variations in thickness may occur as a result of overlapping spray patterns, or at changes in curvature in the mold surface 512. But wide variations in concrete thickness preferably are avoided by refraining from filling the indentations 516 in the mold surface 512 with the concrete material.

The concrete material is then allowed to cure or harden into the concrete layers 14 and 42. The concrete material cures more evenly due to the constant thickness of the concrete layer 14. Referring to FIG. 10*c*, a reinforcement material, such as an elastomer material, is applied to the cured concrete layer 14 (and 42) to form the reinforcement layer 46 (and 58). The elastomer material or reinforcement material preferably is sprayed onto the concrete layers 14 and 42, indicated by arrow 584. In the case of an elastomer material, the elastomer material sets up almost immediately as it is applied to the concrete layers 14 and 42. As stated above, the elastomer material preferably is applied in a thin layer of between 60 to 225 mils, depending on the strength required. As stated above, the concrete layers 14 and 42 preferably are thin to reduce weight and lack glass reinforcement to reduce cost. Thus, the elastomer layers 46 and 58 advantageously provide tensile strength and impact resistance to the concrete layers 14 and 42. In addition, the elastomer material bonds to the concrete layers as it is applied.

The elastomer material may include fiber reinforcement. It will be appreciated that glass fiber reinforcement for the elastomer is much less expensive than the special alkali resistant glass fiber required when mixed with concrete.

Referring to FIGS. 7 and 9, the mold halves 504 and 508, or 554 and 558, are pivoted to the closed position, such that the mold halves are spaced-apart from one another, and a gap or space 528 formed between the concrete layers 14 and 42 and elastomer layers 46 and 58. Referring to FIG. 10*d*, foam is then introduced into the mold 500 (FIG. 7) or 550 (FIG. 9), or the space 528 between the mold halves 504 and 508 (FIG. 7), or 554 and 558 (FIG. 9), as indicated by arrow 588. Preferably, the foam is an expandable foam which expands to fill the space 528 between the concrete layers 14 and 42 and elastomer layers 46 and 58. As the foam material expands, it creates the protrusions 66 which extend into the indentations 30 in the concrete layer 14. The foam stiffens the panel and further reinforces the concrete layers 14 and 42. The foam preferably is a low density foam between two and five pounds to be light-weight. In addition, glass reinforcement may be added to the foam. Again, it will be appreciated that glass reinforcement for foam is much less expensive than a special alkali resistant glass reinforcement required for concrete.

The mold 500 or 550 may then be opened and the resulting panel, or combined concrete layers 14 and 42, elastomer layers 46 and 58, and foam layer 62, removed.

It will be noted that the mold 500 preferably is oriented vertically in order to save space and facilitate handling, thus reducing the need for large equipment to lift and handle heavy molds. In addition, the vertically oriented molds which pivot open allow workers easy access to the interior of the molds. Alternatively, the mold 550 is preferably oriented horizontally while the concrete is applied to prevent the concrete from running, but vertically while the foam is injected. In addition, the vertically oriented molds 500 and 550 result in vertically oriented walls or panels, again saving space.

The method and molds described above also may also be used to manufacture a single sided panel. The concrete and elastomer materials are applied to a single sided mold, as described above. The second mold surface 524 may be flat, or may not have the indentations and protrusions to form stone work, brick, or the like as in the first mold surface 512. Thus, when the mold is closed, a gap or space is formed between the mold halves or between the elastomer layer 46 and the second mold surface 524. Thus, the foam material is introduced into the mold and expands between the elastomer layer 46 and the second mold surface 524. The resulting panel may be removed and a rigid backing layer 104, such as plywood or the like, may be adhered to the exposed foam surface. Alternatively, an elastomer material or the like may be added to the exposed foam layer, forming the rigid backing layer.

The concrete and elastomer layers 14 and 46 by themselves are relatively flexible. Therefore, the molds 500 and 550, or mold halves 504 and 508, 554 and 558, provide rigidity to the concrete and elastomer layers 14 and 46 as the foam material expands.

Alternatively, the rigid backing material 104, such as a plywood sheet, may be placed in the mold adjacent the second mold surface 524 such that the foam material is introduced between the elastomer layer 46 and the rigid backing layer 104 so that the foam bonds to the rigid backing layer 104 in the mold itself.

Alternatively, a concrete material may be applied in a flat layer to the second surface 524 of the mold, and foam introduced so that the resulting wall or panel has a rigid backing layer 104 of concrete formed in the foam material.

Alternatively, the reinforcement layer may be formed by applying a high density foam material directly to the interior surface 22 of the concrete layer 14 and then introducing a lightweight foam material into the mold.

It is of course understood that the molds may have a single mold half. In addition, the rigid backing layer 104, such as a plywood layer, may be utilized as the second mold half.

Figure 11:
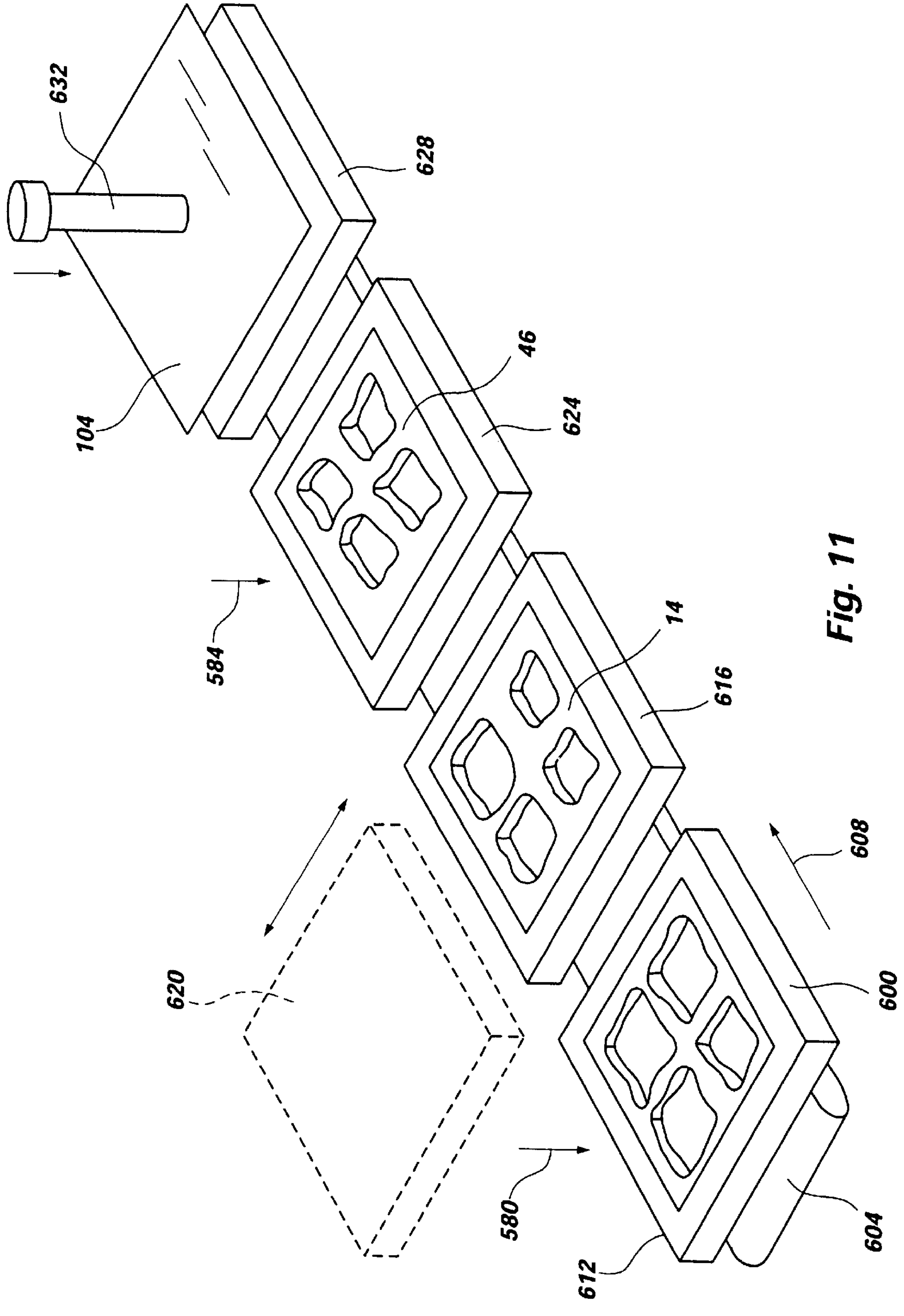
FIG. 11 is a schematic view of a method in accordance with the present invention.

Referring to FIG. 11, a plurality of molds 600 may be disposed on a transfer system 604, such as a moving conveyor, etc., and moved through a plurality of stations, indicated by arrow 608. At a first station 612, the concrete mixture may be applied 580 to the mold 600. The mold 600 is then moved to a curing station 616 where the concrete mixture is cured. The curing station 616 may be on the transfer system 604, or the molds may be removed from the transfer system 604 to a separate curing station 620. The mold 600 may then be moved to a reinforcing station 624 where a reinforcement material, such as the elastomer material, is applied 584 to the concrete layer 14. The mold 600 is then moved to a foam and/or backing layer station 628 where the foam material is applied to the concrete and/or reinforcement layers 14 and 46, and the backing layer 104 is applied. The foam material may be applied, and then the backing layer 104 may be positioned by a press 632 as shown. The foam and backing layer 104 may be applied at the same station 628, as shown, or at different stations. In addition, the walls or panels may be removed from the mold 600 at a different station. Alternatively, the mold 600 may be moved directly from the curing station 616 or 620 to the foam and/or backing layer station 628. The transfer system 604 and plurality of molds 600 facilitate manufacturing larger quantities of walls or panels, and speeds manufacturing.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method for forming a panel, comprising the steps of:

a) providing a mold having an inner mold surface with macro indentations and macro protrusions;

b) applying a wet mixture of concrete material to the inner mold surface of the mold to form a concrete layer including a cross-sectional contour corresponding to the indentations and protrusions of the inner mold surface;

c) curing the concrete material until dry;

d) applying a layer of elastomer material to the concrete layer to form an elastomer layer secured to the concrete layer;

e) introducing foam into the mold to form a foam layer secured to the elastomer layer; and f) removing the secured concrete, elastomer, and foam layers from the mold.

2. A method in accordance with claim 1, wherein the step of providing the mold further includes providing a mold with indentations and protrusions sized and shaped to create another object selected from the group consisting of: rock, stone work, brick, and wood.

3. A method in accordance with claim 1, wherein the step of applying the wet mixture of concrete mixture further includes applying the wet mixture of concrete material in a substantially constant thickness at the projections and indentations.

4. A method in accordance with claim 1, further comprising the step of placing a rigid backing layer spaced-apart from the mold surface prior to introducing the foam into the mold.

5. A method in accordance with claim 1, further comprising the step of applying a rigid backing layer to the foam layer.

6. A method in accordance with claim 1, wherein the step of applying a wet mixture of concrete material further includes applying the wet mixture of concrete material in a layer having a thickness less than approximately 0.5 inches.

7. A method in accordance with claim 1, wherein the step of providing the mold further includes providing the mold in a vertical orientation.

8. A method in accordance with claim 1, wherein the step of applying a wet mixture of concrete material further includes spraying the wet mixture of concrete material onto the inner mold surface.

9. A method in accordance with claim 1, wherein the step of introducing foam into the mold further includes introducing an expandable foam into the mold which expands to fill the indentations in the inner mold surface.

10. A method in accordance with claim 1, wherein the step of providing a mold further includes providing a mold with a second mold surface opposing the inner mold surface; and wherein the step of introducing foam into the mold further includes introducing an expandable foam between the concrete layer and second mold surface.

11. A method in accordance with claim 1, wherein the step of providing a mold further includes providing a mold with a second mold surface pivotally coupled to the inner mold surface such that the inner mold surface and second mold surface pivot between an open position and a closed position in which the mold surfaces oppose one another; and further including the steps of:

opening the mold prior to applying the wet mixture of concrete material; and closing the mold prior to introducing the foam.

12. A method in accordance with claim 1, wherein the step of providing the mold further includes providing a mold with a second mold surface having indentations and protrusions; and wherein applying the wet mixture of concrete material further includes applying a wet mixture of concrete to both the inner mold surface to form a first concrete layer and the second mold surface to form a second concrete layer; and wherein introducing the foam into the mold further includes introducing the foam between the first and second concrete layers to form a foam layer secured to both concrete layers.

13. A method in accordance with claim 1, further comprising the step of:

moving the mold with a transfer system through a plurality of different stations for applying the concrete mixture, curing the concrete mixture, and introducing the foam.

14. A method for forming a panel, comprising the steps of:

a) providing a mold having an inner mold surface with macro indentations and macro protrusions;

b) applying a wet mixture of concrete material to the inner mold surface of the mold to form a concrete layer;

c) curing the concrete material until dry;

d) applying a layer of reinforcement material to the cured concrete layer to form a reinforcement layer;

e) introducing foam into the mold to form a foam layer secured to the reinforcement layer; and f) removing the secured concrete, reinforcement and foam layers from the mold.

15. A method in accordance with claim 14, wherein applying the wet mixture of concrete further includes applying the wet mixture of concrete in a substantially constant thickness at the indentations and protrusions; and wherein applying the reinforcement material further includes applying the reinforcement material in a substantially constant thickness at the indentations and protrusions.

16. A method in accordance with claim 14, wherein the step of providing the mold further includes providing a mold with indentations and protrusions sized and shaped to create another object selected from the group consisting of: rock, stone work, brick, and wood.

17. A method in accordance with claim 14, further comprising the step of placing a rigid backing layer spaced-apart from the mold surface prior to introducing the foam into the mold.

18. A method in accordance with claim 14, further comprising the step of applying a rigid backing layer to the foam layer.

19. A method in accordance with claim 14, wherein applying the reinforcement material further includes applying a layer of elastomer material to the concrete layer to form an elastomer layer.

20. A method in accordance with claim 14, wherein the step of applying the wet mixture of concrete material further includes applying the wet mixture of concrete material in a layer having a thickness less than approximately 0.5 inches.

21. A method in accordance with claim 14, wherein the step of applying the wet mixture of concrete material further includes spraying the wet mixture of concrete material onto the inner mold surface.

22. A method in accordance with claim 14, wherein the step of applying the reinforcement material further includes spraying the reinforcement material onto the cured concrete layer.

23. A method in accordance with claim 14, wherein the step of introducing foam into the mold further includes introducing an expandable foam into the mold which expands to fill the indentations in the inner mold surface.

24. A method in accordance with claim 14, wherein the step of providing a mold further includes providing a mold with a second mold surface opposing the inner mold surface; and wherein the step of introducing foam into the mold further includes introducing an expandable foam between the concrete layer and second mold surface.

25. A method in accordance with claim 14, wherein the step of providing a mold further includes providing a mold with a second mold surface pivotally coupled to the inner mold surface such that the inner mold surface and second mold surface pivot between an open position and a closed position in which the mold surfaces oppose one another; and further including the steps of:

opening the mold prior to applying the wet mixture of concrete material; and closing the mold prior to introducing the foam.

26. A method in accordance with claim 14, wherein the step of providing the mold further includes providing a mold with a second mold surface having indentations and protrusions; and wherein applying the wet mixture of concrete material further includes applying a wet mixture of concrete to both the inner mold surface to form a first concrete layer and the second mold surface to form a second concrete layer; and wherein introducing the foam into the mold further includes introducing the foam between the first and second concrete layers to form a foam layer secured to both concrete layers.

27. A method for forming a panel, comprising the steps of:

a) providing a mold having an inner mold surface with macro indentations and macro protrusions;

b) applying a wet mixture of concrete material to the inner mold surface of the mold to form a concrete layer including a cross-sectional contour corresponding to the indentations and protrusions of the inner mold surface;

c) curing the concrete material until dry;

d) applying a layer of high density foam to the concrete layer to form a reinforcement layer secured to the concrete layer;

e) introducing low density foam into the mold to form a low density foam layer secured to the reinforcement layer;

f) removing the secured concrete, reinforcement and low density foam layers from the mold.

28. A method in accordance with claim 27, wherein the step of providing the mold further includes providing a mold with indentations and protrusions sized and shaped to create another object selected from the group consisting of: rock, stone work, brick, and wood.

29. A method in accordance with claim 27, wherein the step of applying the wet mixture of concrete mixture further includes applying the wet mixture of concrete material in a substantially constant thickness at the projections and indentations.

30. A method in accordance with claim 27, further comprising the step of placing a rigid backing layer spaced-apart from the mold surface prior to introducing the low density foam into the mold.

31. A method in accordance with claim 27, further comprising the step of applying a rigid backing layer to the low density foam layer.

32. A method in accordance with claim 27, wherein the step of applying a wet mixture of concrete material further includes applying the wet mixture of concrete material in a layer having a thickness less than approximately 0.5 inches.

33. A method in accordance with claim 27, wherein the step of providing the mold further includes providing the mold in a vertical orientation.

34. A method in accordance with claim 27, wherein the step of applying a wet mixture of concrete material further includes spraying the wet mixture of concrete material onto the inner mold surface.

35. A method in accordance with claim 27, wherein the step of introducing low density foam into the mold further includes introducing an expandable foam into the mold which expands to fill the indentations in the inner mold surface.

36. A method in accordance with claim 27, wherein the step of providing a mold further includes providing a mold with a second mold surface opposing the inner mold surface; and wherein the step of introducing low density foam into the mold further includes introducing an expandable foam between the concrete layer and second mold surface.

37. A method in accordance with claim 27, wherein the step of providing a mold further includes providing a mold with a second mold surface pivotally coupled to the inner mold surface such that the inner mold surface and second mold surface pivot between an open position and a closed position in which the mold surfaces oppose one another; and further including the steps of:

opening the mold prior to applying the wet mixture of concrete material; and closing the mold prior to introducing the low density foam.

38. A method in accordance with claim 27, wherein the step of providing the mold further includes providing a mold with a second mold surface having indentations and protrusions; and wherein applying the wet mixture of concrete material further includes applying a wet mixture of concrete to both the inner mold surface to form a first concrete layer and the second mold surface to form a second concrete layer; and wherein introducing the low density foam into the mold further includes introducing the low density foam between the first and second concrete layers to form a low density foam layer secured to both concrete layers.

39. A method in accordance with claim 27, further comprising the step of:

moving the mold with a transfer system through a plurality of different stations for applying the concrete mixture curing the concrete mixture, and introducing the low density foam.

* * * * *